United States Patent [19]

Widener

[11] Patent Number: 4,788,026

[45] Date of Patent: Nov. 29, 1988

[54] NUCLEAR FUEL ASSEMBLY GRID SLEEVE/GUIDE THIMBLE BULGE ORIENTATION GAGE AND INSPECTION METHOD

[75] Inventor: Wade H. Widener, Cayce, S.C.

[73] Assignee: Westinghouse Electric Corp., Pittsburgh, Pa.

[21] Appl. No.: 137,621

[22] Filed: Dec. 24, 1987

[51] Int. Cl.$^4$ .............................................. G21C 17/00
[52] U.S. Cl. ..................................... 376/245; 33/502; 33/534; 33/538
[58] Field of Search ......................... 33/502, 534, 538; 376/245

[56] References Cited

U.S. PATENT DOCUMENTS 4,716,017 12/1987 Kerrey ................................ 376/245

Primary Examiner—Charles T. Jordan
Assistant Examiner—Richard W. Wendtland

[57] ABSTRACT

An inspection gage includes an expandable tubular member insertable within a fuel assembly guide thimble. The tubular member has embossments circumferentially spaced from one another about the tubular member and being the same in number as bulges on the guide thimble and configured to fit therewithin. An expansion member rotatably mounts the tubular member and is axially movable therewithin when the latter is inserted within the guide thimble. The expansion member is movable between a first position in which it permits inward contraction of the tubular member an displacement of its embossments away from the guide thimble bulges for removing the embossments from registry therewith and a second position in which it produces radial expansion of the tubular member and displacement of its embossments toward the guide thimble bulges for placing the embossments in registry therewith. A handle is used for rotating the tubular member relative to the expansion member so as to bring the embossments into alignment with the guide thimble bulges concurrently as the embossments are being displaced toward and into registry with the bulges. An indicator mechanism responses to rotation of the tublar member away from a reference position to provide an indication of the orientation of the guide thimble bulges relative to a reference point upon displacement of the embossments into registry therewith.

18 Claims, 6 Drawing Sheets

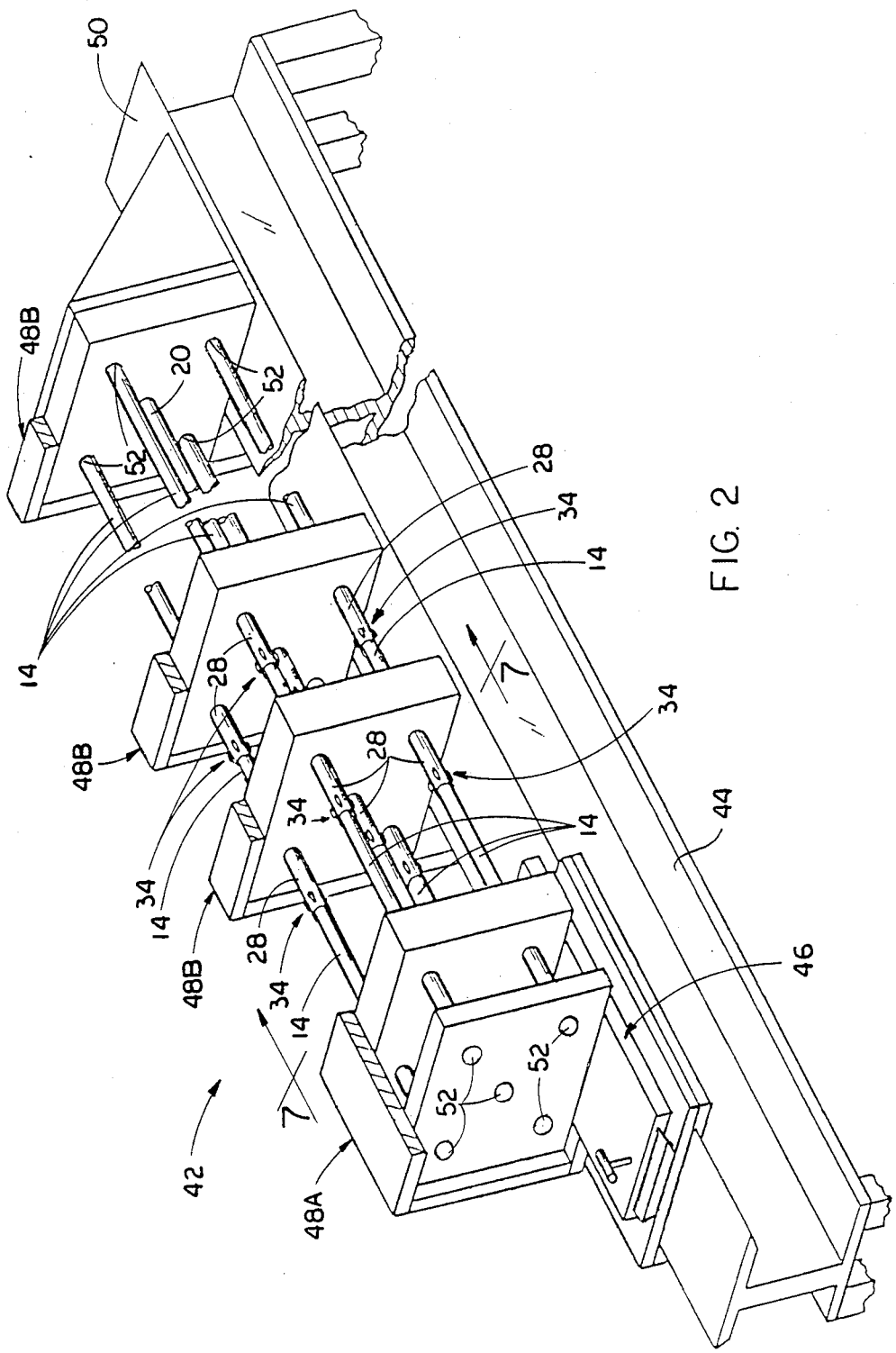

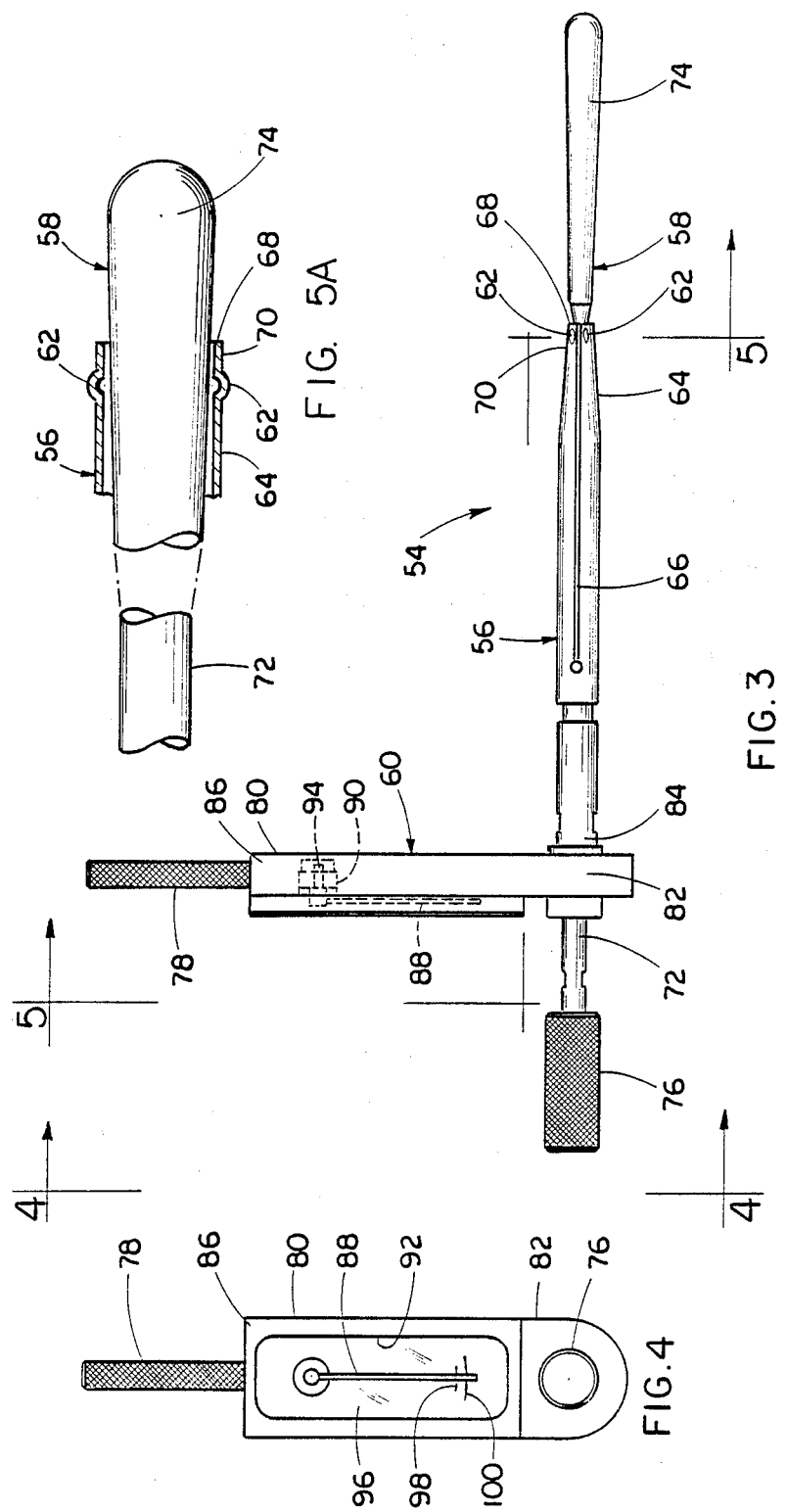

NUCLEAR FUEL ASSEMBLY GRID SLEEVE/GUIDE THIMBLE BULGE ORIENTATION GAGE AND INSPECTION METHOD

CROSS REFERENCE TO RELATED APPLICATIONS

Reference is hereby made to the following copending patent application dealing with related subject matter and assigned to the assignee of the present invention: "Reduced Stress Fuel Assembly Fabrication Apparatus And Method" by John S. Kerrey et al, assigned U.S. Ser. No. 046,328 and filed May 6, 1987 (W.E. 53,667).

BACKGROUND OF THE INVENTION

1. Field of the Invention

The present invention relates generally to fuel assemblies for use in nuclear reactors and, more particularly, is concerned with a gage and inspection method for determining the orientation of bulges connecting grid sleeves with guide thimbles in fuel assemblies.

2. Description of the Prior Art

A typical pressurized water nuclear reactor contains a large number of fuel assemblies in its core. Each fuel assembly in the reactor core has the same construction. Basically, a fuel assembly is composed of a bottom nozzle, a top nozzle, an instrumentation tube and pluralities of guide thimbles, fuel rods and grids. The guide thimbles extend vertically between the bottom and top nozzles and rigidly interconnect them. The grids are attached in axially spaced positions along the guide thimbles such that a multiplicity of cells defined by interleaved straps of the respective grids are disposed in vertical alignment. The fuel rods are supported in an organized and transversely spaced array in the vertically aligned cells of the transverse grids by springs and dimples on the straps which extend into the cells.

The grids have short sleeves which extend above and below the interleaved straps for receiving therethrough the guide thimbles and providing means for attaching the grids thereto. Typically, concentric portions of the guide thimbles and grid sleeves are deformed or bulged together, such as by plastic expansion, to form mechanical expansion joints therebetween above and below the respective grids. In assembling the fuel assembly, the grids are attached to the guide thimbles beginning adjacent the lower ends thereof first and proceeding to adjacent the upper ends thereof. When subsequently the fuel rods are loaded through the grids, each guide thimble is surrounded by four fuel rods. The guide thimbles are typically larger in diameter than the fuel rods and so the space between a guide thimble and the adjacent fuel rods is less than between adjacent fuel rods. This reduction in the spacing between each guide thimble and its adjacent fuel rods reduces the amount of coolant flow along the sides of these fuel rods facing the guide thimble and thereby the amount of heat transfer from the fuel rods to the flowing coolant. This situation is termed hot channel factor which creates a departure for natural boiling (DNB) condition.

Therefore, in creating external bulges in the coaxially fitted grid sleeves and guide thimble to connect the same together, it is important to not aggravate the DNB condition by reducing the gap between the fuel rods and the guide thimble any further. Thus, it is most desirable to form each set of four bulges at 45-, 135-, 225- and 315-degree positions (hereinafter referred to as 45-degree reference points) about the guide thimble relative to placement of the fuel rods at 0-, 90-, 180- and 270-degree positions (hereinafter referred to as X-Y axes reference points) about the guide thimble. Accepted standards allow a maximum deviation from the 45-degree reference points of ±11 degrees at one bulge location and ±6 degrees at the rest of the bulge location.

The conventional process used to produce the expansion joints at each grid location forms each set of bulges at the same orientation from one grid to the next. Therefore, quality control personnel only need to inspect the expansion joints at the uppermost grid to determine whether the sets of bulges are located within the allowed range of deviation from the desired 45-degree reference points. Heretofore, the inspection method of verifying expansion joint orientation has been carried out through application of visual standards.

One major shortcoming of this inspection method is that it is too dependent on the subjective judgment of the personnel carrying it out. Consequently, a need exists for an approach to bulge orientation determination which will yield more objective or positive results, being independent of the skill of the particular inspector.

SUMMARY OF THE INVENTION

The present invention provides a gage and inspection method designed to satisfy the aforementioned needs. The gage of the present invention employs an expander mandrel slidable in an expandable sleeve insertable within a guide thimble and having embossments angular displaced ninety degrees from one another about the sleeve and being configured to mate with the set of bulges formed in the guide thimble. The gage also utilizes an indicator mechanism having a pointer which functions like a plumb bob to indicate bulge orientation when the embossments projecting from the exterior of the sleeve are mated with the set of bulges. In such manner, the gage of the present invention can be used to positively determine the orientation of the bulges connecting the respective grid sleeve with the guide thimble.

Accordingly, the present invention is directed to a gage for inspecting a nuclear fuel assembly to determine the orientation of a plurality of externally-projecting mated bulges connecting a hollow grid sleeve to a hollow guide thimble of the assembly. The gage comprises: (a) a radially-expandable tubular member insertable within the guide thimble and having formed thereon externally-projecting embossments spaced circumferentially from one another about the tubular member, the embossments being the same in number as the bulges of the guide thimble and configured to fit therewithin; (b) an elongated expansion member rotatably mounting the tubular member and being axially movable within the tubular member when the latter is inserted within the guide thimble, the expansion member being movable relative to the tubular member between a first position in which the expansion member permits inward contraction of the tubular member and displacement of the embossments thereon away from the interior of the guide thimble bulges for removing the embossments from registry therewith and a second position in which the expansion member produces radial expansion of the tubular member and displacement of the embossments thereon toward the interior of the guide thimble bulges for placing the embossments in registry therewith; (c) means for rotating the tubular member relative to the expansion member so as to bring the embossments on the tubular member into alignment with the guide thimble bulges as the embossments on the tubular member are being displaced toward and into registry with the interior of the bulges; and (d) an indicator mechanism responsive to rotation of the tubular member away from a reference position for providing an indication of the orientation of the guide thimble bulges relative to a reference point upon displacement of the embossments into registry with the guide thimble bulges.

More particularly, the tubular member has a plurality of elongated resiliently-yieldable fingers defined by a plurality of longitudinally extending and circumferentially spaced apart slots defined in the tubular member and opening at a forward edge thereof. Each embossment is formed on a forward end portion of one of the fingers. The indicator mechanism includes an upright member at an inner end portion being attached to the tubular member at a rearward end portion so as to undergo pivotal movement as the tubular member is rotated. Also, the indicator mechanism includes an elongated pointer element pivotally mounted to an outer end portion of the upright member so as to adapt the pointer element to pivot relative to the upright member in responsive to rotation of the tubular member away from the reference position in bringing the embossments into registry with the guide thimble bulges. The extent of pivoting of the pointer element away from a reference location providing the indication of the orientation of the bulges relative to the reference point.

Furthermore, the upright member includes a indicator scale thereon being visible to a person operating the gage. The scale extends in opposite directions from the reference location of the pointer element. Preferably, the scale is in the form of at least one slot. The expansion member includes an elongated shaft which extends through the tubular member and rotatably mounts the same, and a tapered mandrel fixedly mounted to one end of the shaft. The means for moving the expansion member relative to the tubular member is a handle fixedly attached to an opposite end of the shaft.

Further, the present invention is directed to method of inspecting a fuel assembly to determined the orientation of a plurality of externally-projecting mated bulges connecting a grid sleeve to a guide thimble of the assembly. The method comprises the steps of: (a) inserting a radially-expandable tubular member within the guide thimble, the tubular member having externally-projecting embossments thereon spaced circumferentially from one another about the tubular member, the embossments being the same in number as the bulges of the guide thimble and configured to fit therewithin; (b) axially moving an elongated expansion member, which extends through and rotatably mounts the tubular member, relative to the tubular member from a first position in which the expansion member permits inward contraction of the tubular member and displacement of embossments away from the interior of the guide thimble bulges for removing the embossments from registry therewith and a second position in which the expansion member produces radial expansion of the tubular member and displacement of the embossments toward the interior of the bulges for placing the embossments in registry therewith; and (c) rotating the tubular member relative to the expansion member so as to bring the embossments into alignment with the guide thimble bulges as the embossments on the tubular member are being displaced toward and into responsive to rotation of the tubular member away from a reference position, providing an indication of the orientation of the guide thimble bulges relative to a reference point upon displacement of the embossments into registry therewith.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 2 is a schematical perspective view of a fuel assembly fabrication apparatus constituting the invention of the cross-referenced application.

FIG. 3 is a side elevational view of the gage of the present invention.

FIG. 4 is an end elevational view of the gage as seen along line 4—4 of FIG. 3.

FIG. 5A is an enlarged fragmentary view, partly in section, of the forward portion of the gage of FIG. 5.

DETAILED DESCRIPTION OF THE INVENTION

Figure 1:
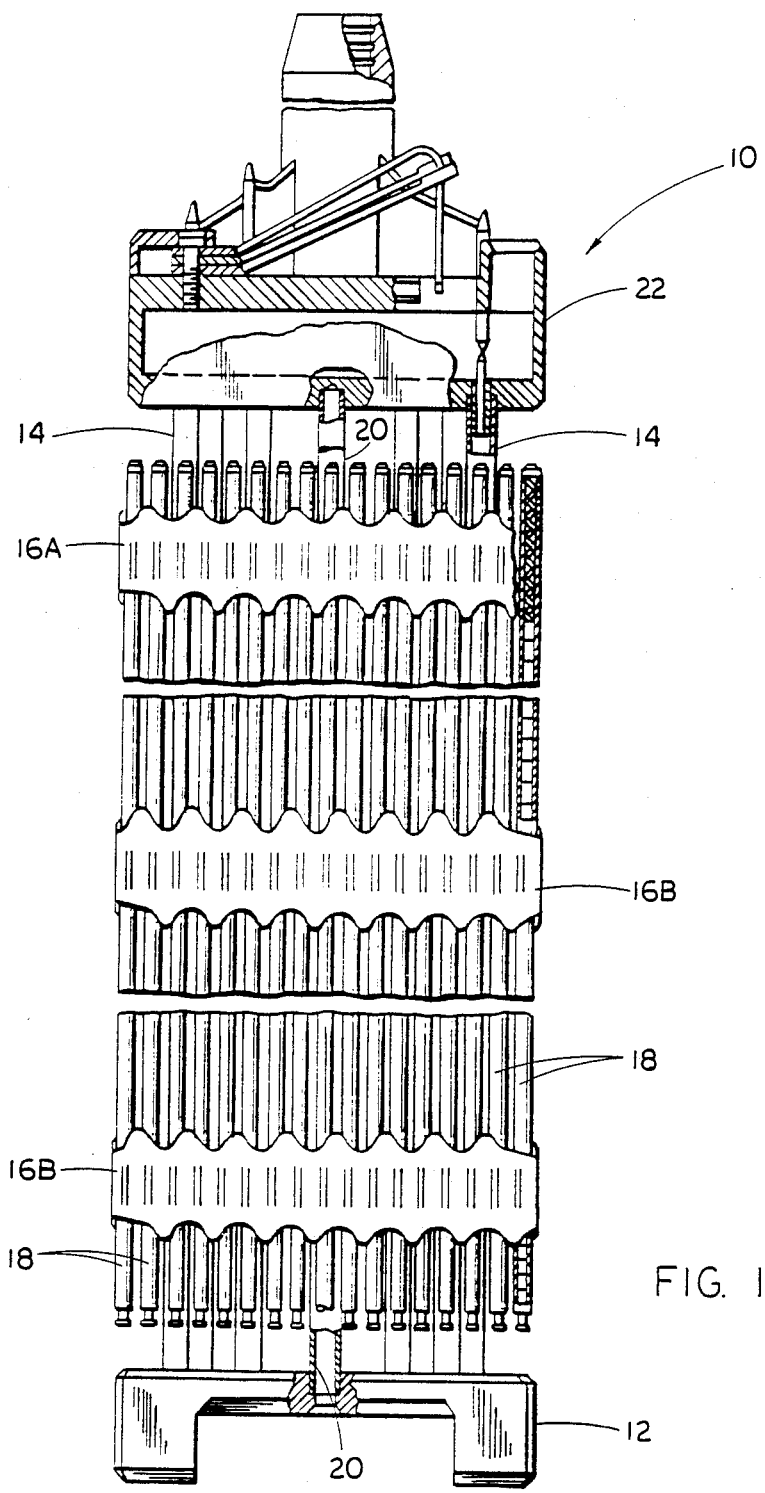
FIG. 1 is an elevational view, partly in section, of a fuel assembly having expansion joints connecting its guide thimbles and grid sleeves whose orientation is capable of being inspected by the gage and method of the present invention.
Figures 5, 6:
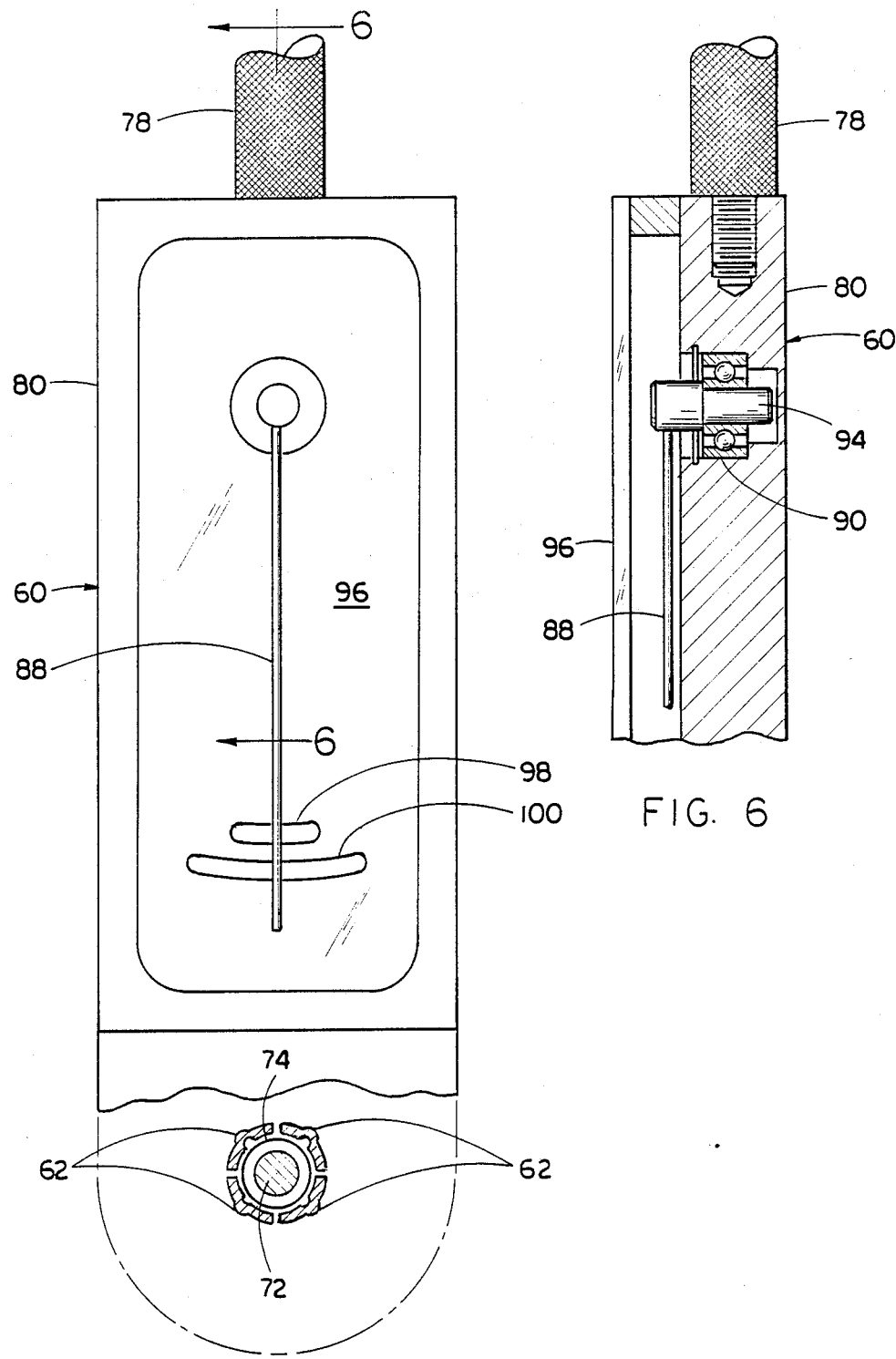
FIG. 5 is an enlarged end elevational view, partly in section, of the gage as seen along line 5—5 of FIG. 3.
FIG. 6 is a sectional view of the gage taken along line 6—6 of FIG. 5.

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an elevational view of a completed fuel assembly, represented in vertically foreshortened form and being generally designated by the number 10. The fuel assembly 10 is the type used in pressurized water reactor (PWR) and basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the fuel assembly 10 has an instrumentation tube 20 located in the center thereof and an upper end structure or top nozzle 22 attached to the upper ends of the guide thimbles 14. With such an arrangement of parts, the fuel assembly 10 forms an integral unit capable of being conventionally handled without damaging the assembly parts.

Figure 7:
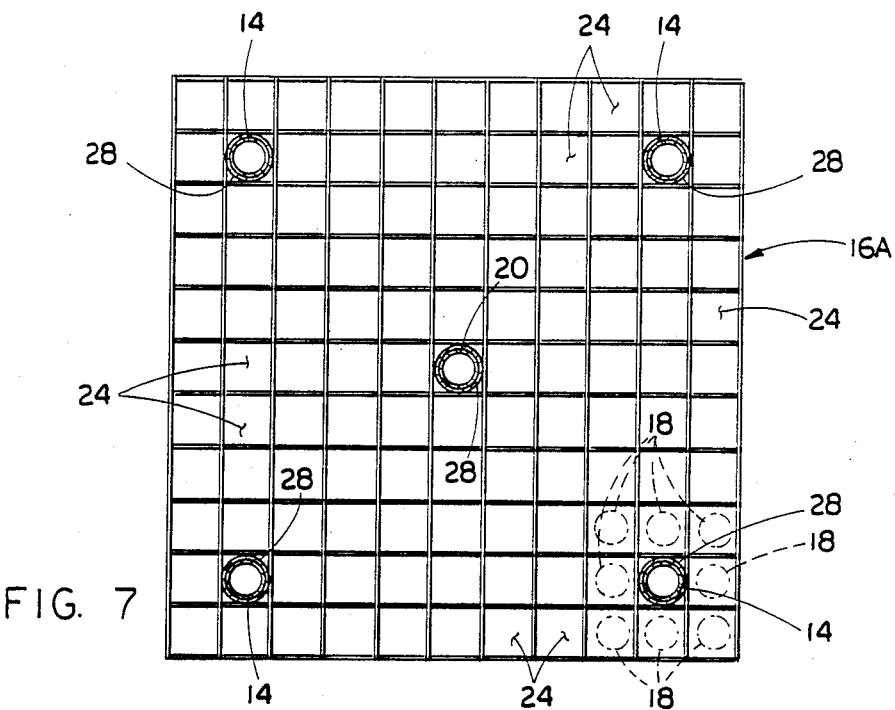
FIG. 7 is an enlarged plan view, partly in section, of one of the upper grids of the fuel assembly as seen along line 7—7 of FIG. 2.
Figure 8:
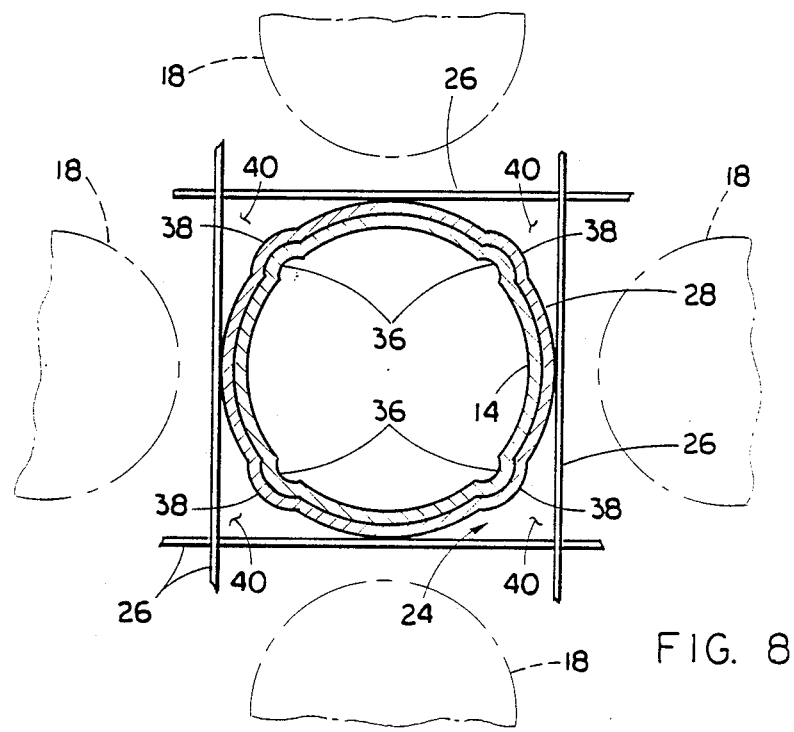
FIG. 8 is an enlarged fragmentary plan view of the grid of FIG. 7, illustrating the expansion joint connecting one grid sleeve and guide thimble of the fuel assembly.
Figure 9:
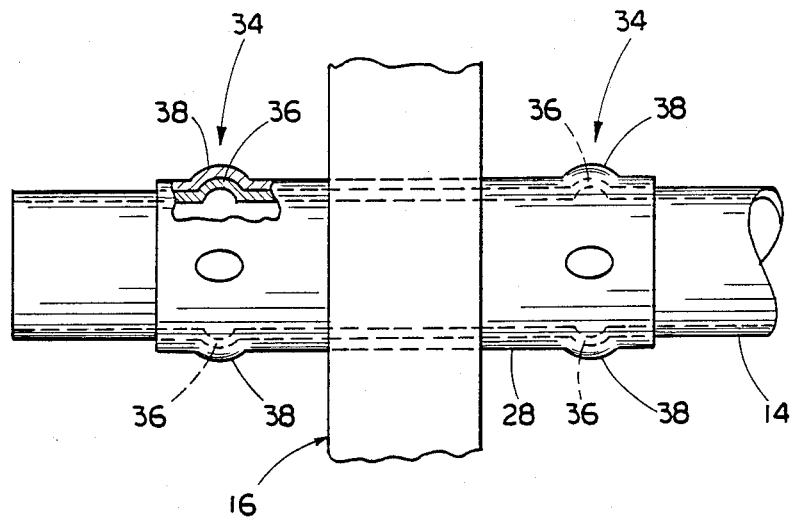
FIG. 9 is a fragmentary side elevational view, partly in section, of the grid as seen along line 9—9 of FIG. 8, showing the expansion joints made in the one grid sleeve and guide thimble respectively above and below the one fuel assembly grid.
Figure 10:
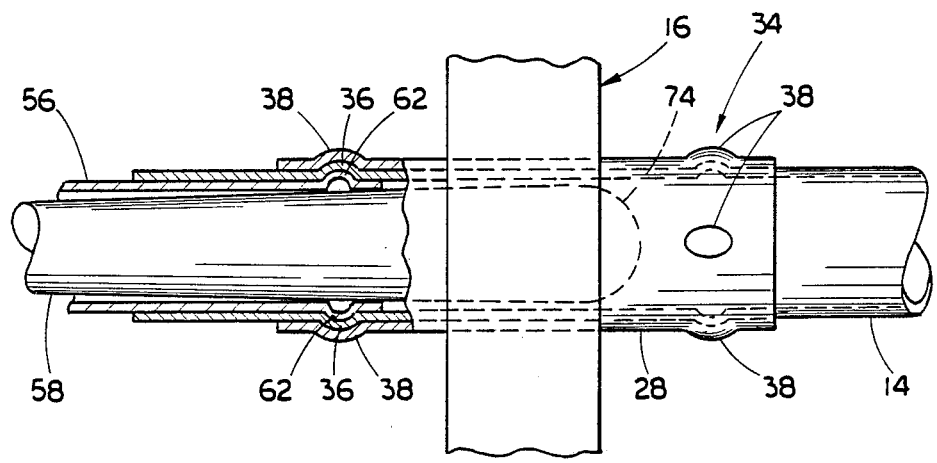
FIG. 10 is a view similar to that of FIG. 9, illustrating the forward end of the gage of the present invention, partly in section, being inserted into the guide thimble.

The guide thimbles 14 extend vertically between the bottom and top nozzles 12,22 and rigidly interconnect them. The grids 16 are attached in axially spaced positions along the guide thimbles 14. Each grid 16 has a multiplicity of cells 24 defined by interleaved straps 26. The cells 24 of the respective axially spaced grids 16 are disposed in vertical alignment for receiving respective arrays of guide thimbles 14 and fuel rods 18 therethrough. Each grid 16 also has a plurality of short sleeves 28, one of which is shown in FIGS. 8–10, extending through those of the grid cells 24 which receive the guide thimbles 14. Only five guide thimbles 14 of the fuel assembly 10 and five such sleeves 28 per grid 16 are illustrated in FIGS. 2 and 7. The sleeves 28 extend above and below the grid 16 for receiving the guide thimbles 14 therethrough and provides means for attaching the grid 16 thereto. Typically, concentric portions 30,32 of the guide thimble 14 and grid sleeve 28 are deformed or bulged together, such as by plastic expansion, to form mechanical expansion joints 34 therebetween above and below the grid 16.

Referring now to FIGS. 8 and 9, there is shown one guide thimble 14 extending through a selected one of the grid cells 24 and the respective one grid sleeve 28 associated with the one cell 24. The guide thimble 14 is depicted rigidly connected to the grid sleeve 28 by the expansion joints 34 located above and below the grid 16. Each expansion joint 34 is formed by externally-projecting mated bulges 36,38 produced in the concentric portions 30,32 of the guide thimble 14 and grid sleeve 28. For accommodating thermal/hydraulic considerations, as shown in FIG. 8 the two mated sets of four bulges 36,38 each expansion joint 34 are optimally produced at 45-, 135-, 225- and 315-degree positions, or at the 45-degree reference points, adjacent to and facing toward the corners 40 of the grid cell 24 and angular displaced about the guide thimble 14 and grid sleeve 28 relative to placement of the fuel rods 18 at 0-, 90-, 180- and 270-degree positions, or at the X-Y axes reference points about the guide thimble 14.

FUEL ASSEMBLY FABRICATION APPARATUS

Referring now to FIG. 2, there is shown a fuel assembly fabrication apparatus, constituting the invention of the above cross-referenced application and being generally indicated by the numeral 38. In its basic components, the fabrication apparatus 42 includes an elongated stationary support fixture 44, a slide fixture 46, and a plurality of clamp structures 48. The slide fixture 46 is mounted to one end portion of the support fixture 44 for reciprocatory movement therealong in the direction of the double arrows. The clamp structures 48 are disposed in spaced relation longitudinally along the stationary support fixture 44. One of the clamp structures 48A is mounted on the movable slide fixture 46 and adapted to support at a preset distance apart from one another the top nozzle 22 and an uppermost one of the plurality of grids 16A of the fuel assembly 10. The remaining ones of the clamp structures 48B are mounted on the upper surface 50 of the stationary support fixture 44 and adapted to support the bottom nozzle 12 and each of remaining grids 16B of the fuel assembly 10. The one clamp structure 48A and the remaining clamp structures 48B are adapted to respectively support the top nozzle 22 and uppermost grid 16A and the bottom nozzle 12 and remaining grids 16B in generally parallel relationship. In such relationship, a plurality of passageways 52 defined in the top and bottom nozzles 12,22 and the plurality of grid sleeves 28 are aligned so that the plurality of guide thimbles 14 and the instrumentation tube 20 can be slidably inserted therethrough for attachment to the nozzles 12,22 and the grid sleeves 28.

In using the apparatus 42 to fabricate the fuel assembly 10, the bottom nozzle 12 and the grids 16B (minus the uppermost one 16A) are first installed in their respective clamp structures 48B in generally parallel spaced relationship to one another such that the passageways 52 defined in the bottom nozzle 12 are aligned with the sleeves 28 mounted on the grids 16B. Next, the guide thimbles 16 and instrumentation tube 20 are installed through the respective aligned passageways 52 of the bottom nozzle 12 and sleeves 28 of the grids 16B. Then, the top nozzle 22 and uppermost one of the grids 16A are installed at the fixed spacing and generally parallel relationship to one another in the top clamp structure 48A with the passageways 52 of the top nozzle 22 aligned with the sleeves 28 of the uppermost grid 16A and with the uppermost grid sleeves receiving the guide thimbles 14 and the instrumentation tube 20 therethrough. Short extension sleeves (not shown) are now installed through the passageways 52 of the top nozzle 22 and in overlapping relation with the upper ends of the guide thimbles 16. After installation of all the aforementioned components, all clamp structures 48 are tightened.

The guide thimbles 14 and instrumentation tube 20 are first attached, such as by using known threaded fasteners (not shown), to the bottom nozzle 12. Then, they are attached to the sleeves 28 of the grids 16 using an internal bulging tool (not shown), beginning at the lowermost grid 16B and working successively up toward the uppermost grid 16A. It should be pointed out that in some fuel assemblies, the lowermost grid 16B is not actually attached to the guide thimbles 14, but instead rests on spacer sleeves (not shown) surrounding the guide thimbles above the bottom nozzle 12. As mentioned previously, FIG. 9 illustrates typical mechanical expansion joints 34 formed above and below the grid 16 between concentric portions 30,32 of the guide thimble 14 and grid sleeves 28. Alternatively, only one of the joints 34 either above or below the grid 16 could be provided instead of both of them.

Orientation Inspection Gage and Mathod

As mentioned previously, the conventional process used to produce the bulges 36,38 of the extension joints 34 at each grid location provides the bulges 36,38 at the same orientation from one grid to the next. Thus, only the expansion joints 34 at the uppermost grid 16A need to be inspected to determined whether the bulges 36,38 are located within the allowed deviation range from the desired 45-degree reference points shown in FIG. 8.

Referring now to FIGS. 3-6, there is illustrated a gage, generally designated by the numeral 54, for use in carrying out the inspection of the fuel assembly 10 in a more objective and positive way in determining whether or not its expansion joints 34 are properly oriented. In its basic components, the gage 54 includes a radially-expandable tubular member 56, an elongated expansion member 58, and an indicator mechanism 60.

The tubular member 56 of the gage 54 is insertable within one guide thimble 14 at a time and has externally-projecting dimples or embossments 62 formed thereon circumferentially spaced from one another about the tubular member 56. The embossments 62 are the same in number (such being four in the example herein) as the bulges 36 of the guide thimble 14 and configured to fit within the interior of the bulges 36. More particularly, the tubular member 56 has a plurality of elongated resiliently-yieldable fingers 64 defined by a plurality of longitudinally extending and circumferentially spaced apart slots 66 defined in the tubular member 56 and opening at a forward edge 68 thereof. Each embossment 62 is formed on a forward end portion 70 of one of the fingers 64.

The expansion member 58 of the gage 54 includes an elongated shaft 72 which extends through the tubular member 56 and rotatably mounts the same. A rearwardly-tapered mandrel 74 is fixedly mounted to the forward end of the expansion member shaft 72, whereas means in the form of a handle 76 used to slidably move the shaft 72 and mandrel 74 therewith relative to the tubular member 56 is fixedly attached to the opposite rearward end of the shaft 72. As shown in FIG. 3, the tubular member 56 resides along the shaft 72 between the forwardly-disposed tapered mandrel 74 and rearwardly-disposed handle 76.

Thus, it is apparent that the shaft 72 of the expansion member 58 which rotatably mounts the tubular member 56 can also be moved axially within the tubular member 56, by using the handle 76, even after the tubular member 56 has been inserted within a guide thimble 14. Specifically, the expansion member 58 can be moved relative to the tubular member 56 between a first position seen in FIG. 3 and a second position seen in FIG. 10. In the first position of FIG. 3, the expansion member mandrel 74 is withdrawn forwardly from within the forward edge 68 of the tubular member 56, permitting (due to the resiliently-yieldable metal from which the tubular member 56 is made) inward contraction of the tubular member 56 at the forward end portions 70 of its fingers 64 and thereby displacement of the embossments 62 thereon away from the interior of the guide thimble bulges 36 which removes the embossments 62 from possible registry with the guide thimble bulges 36. In the second position of FIG. 10, the expansion member mandrel 74 is extended rearwardly within the forward edge 68 of the tubular member 56, producing radial expansion of the tubular member 56 at the forward end portions 70 of its fingers 64 and thereby displacement of the embossments 62 thereon toward the interior of the guide thimble bulges 36 which can place the embossments 62 in registry with the guide thimble bulges 36 when aligned therewith.

A handle 80 on the tubular member 56 is used to rotate the tubular member 56 relative to the expansion member 58 so as to bring the embossments 62 on the forward end portions 70 of the tubular member fingers 64 into alignment with the guide thimble bulges 36 concurrently as the embossments 62 on the tubular member 56 are being displaced toward and into registry with the interior of the guide thimble bulges 36 by pulling on the handle 76 of the expansion member 58.

The indicator mechanism 60 of the gage 54 includes an upright member 80 which at an inner end portion 82 thereof is attached to the tubular member 56 at a rear end portion 84 thereof. Thus, the upright member 80 will undergo pivotal movement as the tubular member 56 is rotated. The handle 78 attached to an outer end portion 86 of the upright member 80 can, therefore, be used to rotate the tubular member 56 about the expansion member shaft 72.

The indicator mechanism 60 further includes an elongated needle or pointer element 88 pivotally mounted by a bearing 90 to the outer end portion 86 of the upright member 80 below the handle 78. The pointer element 88 is thereby adapted to pivot relative to the upright member 80 in responsive to pivoting of the upright member 80 with rotation of the tubular member 56 about the expansion member shaft 72 away from a generally vertical reference position, seen in FIGS. 36, should such rotation be necessary to bring the embossments 62 into registry with the guide thimble bulges 36. The extent of pivoting of the pointer element 88 away from its vertical reference location provides an indication of the orientation of the guide thimble bulges 36 relative to the desired 45-degree reference point.

The pointer member 88 is disposed within a recess 92 formed on the front face of the upright member 80 and is attached to a pin 94 rotatably interfitted within the bearing 90. A transparent plate 96 covers the recess 92 and has an indicator scale formed therein which is visible to a person operating the gage 54. Preferably, the scale is in the form of a pair of arcuate-shaped slots 98,100 defined one above the other and extending in opposite directions from the zero or generally vertical reference location of the pointer element 88. The upper slot 98 represents a 6-degree displacement in either direction from the zero or vertical reference position of the pointer element 88, whereas the lower slot 100 represents a 11-displacement in either direction from the zero reference location.

In using the gage 54 for inspecting the nuclear fuel assembly 10 to determined the orientation of the mated bulges 36,38 connecting one grid sleeve 28 to one guide thimble 14 of the fuel assembly, the tubular member 56 is first inserted within the upper end of the hollow guide thimble 14 until its forward edge 68 is generally aligned with the location of the expansion joint 34. The expansion member 58 is then axially moved in incremental fashion from its first to second positions relative to the tubular member 56 concurrently as the tubular member 56 is rotated in incremental fashion relative to the expansion member 58. In such manner, the embossments 62 on the tubular member 56 are brought into alignment with the guide thimble bulges 36 concurrently as the they are being displaced toward and into registry with the interior of the guide thimble bulges 36. The pointer element 88 responds to rotation of the tubular member 56 and pivoting therewith of the upright member 80 so as to move away from its reference position toward the either of the ends of the slots 98,100 and thereby provide an indication of the orientation of the guide thimble bulges 36 relative to their desired 45-degree reference point.

I claim:

1. A gage for inspecting a nuclear fuel assembly to determine the orientation of a plurality of externally-projecting mated bulges connecting a hollow grid sleeve to a hollow guide thimble of the assembly, said gage comprising:
   (a) a radially-expandable tubular member insertable within the guide thimble and having formed thereon externally-projecting embossments circumferentially spaced from one another about said tubular member, said embossments being the same in number as the bulges of the guide thimble and configured to fit therewithin;
   (b) an elongated expansion member rotatably mounting said tubular member and being axially movable within said tubular member when the latter is inserted within the guide thimble, said expansion member being movable relative to said tubular member between a first position in which said expansion member permits inward contraction of said tubular member and displacement of said embossments away from the interior of the guide thimble bulges for removing said embossments from registry therewith and a second position in which said expansion member produces radial expansion of said tubular member and displacement of said embossments toward the interior of the guide thimble bulges for placing said embossments in registry therewith;
   (c) means for rotating said tubular member relative to said expansion member so as to bring said embossments on said tubular member into alignment with the guide thimble bulges as said embossments on said tubular member are being displaced toward and into registry with the interior of the bulges; and
   (d) an indicator mechanism responsive to rotation of said tubular member away from a reference position for providing an indication of the orientation of the guide thimble bulges relative to a reference point upon displacement of said embossments into registry with the guide thimble bulges.

2. The gage as recited in claim 1, said tubular member has a plurality of elongated resiliently-yieldable fingers defined by a plurality of longitudinally extending and circumferentially spaced apart slots defined in said tubular member and opening at a forward edge thereof, each of said embossments being formed on a forward end portion of one of said fingers.

3. The gage as recited in claim 1, wherein said indicator mechanism includes:
   an upright member at an inner end portion being attached to said tubular member at a rearward end portion so as to undergo pivotal movement as said tubular member is rotated;
   an elongated pointer element pivotally mounted to an outer end portion of said upright member so as to adapt said pointer element to pivot relative to said upright member in responsive to rotation of said tubular member away from the reference position in bringing said embossments into registry with the guide thimble bulges, said extent of pivoting of said pointer element away from a reference location providing said indication of the orientation of the bulges relative to the reference point.

4. The gage as recited in claim 3, wherein said means for rotating said tubular member relative to said expansion member is a handle fixedly attached to said outer end portion of said upright member.

5. The gage as recited in claim 3, wherein said upright member includes a bearing which pivotally mounts said pointer element.

6. The gage as recited in claim 3, wherein said upright member includes an indicator scale thereon being visible to a person operating said gage, said scale extending in opposite directions from said reference location of said pointer element.

7. The gage as recited in claim 6, wherein said scale is in the form of at least one slot.

8. The gage as recited in claim 1, wherein said expansion member includes:
   an elongated shaft which extends through said tubular member and rotatably mounts the same; and
   a tapered mandrel fixedly mounted to one end of said shaft.

9. The gage as recited in claim 7, wherein said means for moving said expansion member relative to said tubular member is a handle fixedly attached to an opposite end of said shaft.

10. A gage for inspecting a nuclear fuel assembly to determine the orientation of a plurality of externally-projecting mated bulges connecting a hollow grid sleeve to a hollow guide thimble of the assembly, said gage comprising:
    (a) a radially-expandable tubular member insertable within the guide thimble and having externally-projecting embossments spaced circumferentially from one another about said tubular member, said embossments being the same in number as the bulges of the guide thimble and configured to fit therewithin;
    (b) an elongated expansion member rotatably mounting said tubular member and being axially movable within said tubular member when the latter is inserted within the guide thimble, said expansion member being movable relative to said tubular member between a first position in which said expansion member permits inward contraction of said tubular member and displacement of said embossments away from the interior of the guide thimble bulges for removing said embossments from registry therewith and a second position in which said expansion member produces radial expansion of said tubular member and displacement of said embossments toward the interior of the guide thimble bulges for placing said embossments in registry therewith;
    (c) means for rotating said tubular member relative to said expansion member so as to bring said embossments on said tubular member into alignment with the guide thimble bulges concurrently as said embossments on said tubular member are being displaced toward and into registry with the interior of the guide thimble bulges; and
    (d) an indicator mechanism responsive to rotation of said tubular member away from a reference position for providing an indication of the orientation of the guide thimble bulges relative to a reference point upon displacement of said embossments into registry with the guide thimble bulges;

(e) said tubular member having a plurality of elongated resiliently-yieldable fingers defined by a plurality of longitudinally extending and circumferentially spaced apart slots defined in said tubular member and opening at a forward edge thereof, each of said embossments being formed on a forward end portion of one of said fingers;

(f) said indicator mechanism including an upright member at an inner end portion being attached to said tubular member at a rearward end portion so as to undergo pivotal movement as said tubular member is rotated, and an elongated pointer element pivotally mounted to an outer end portion of said upright member so as to adapt said pointer element to pivot relative to said upright member in responsive to rotation of said tubular member away from the reference position in bringing said embossments into registry with the guide thimble bulges, the extent of pivoting of said pointer element away from a reference location providing said indication of the orientation of the guide thimble bulges relative to the reference point.

11. The gage as recited in claim 10, wherein said upright member includes an indicator scale thereon being visible to a person operating said gage, said scale extending in opposite directions from said reference location of said pointer element.

12. The gage as recited in claim 11, wherein said scale is in the form of at least one slot.

13. The gage as recited in claim 10, wherein said means for rotating said tubular member relative to said expansion member is a handle fixedly attached to said outer end portion of said upright member.

14. The gage as recited in claim 10, wherein said expansion member includes:

an elongated shaft which extends through said tubular member and rotatably mounts the same; and a tapered mandrel fixedly mounted to one end of said shaft.

15. The gage as recited in claim 14, wherein said means for moving said expansion member relative to said tubular member is a handle fixedly attached to an opposite end of said shaft.

16. The gage as recited in claim 10, wherein said upright member has a recess defined therein, said pointer element is disposed in said recess and a transparent plate covers said recess.

17. The gage as recited in claim 16, wherein said transparent plate has at least one arcuate-shaped slot formed therein which constitutes an indicator scale being visible to a person operating said gage and extending in opposite directions from said reference location of said pointer element.

18. A method of inspecting a fuel assembly to determined the orientation of a plurality of externally-projecting mated bulges connecting a grid sleeve to a guide thimble of the assembly, said method comprising the steps of:

(a) inserting a radially-expandable tubular member within the guide thimble, the tubular member having externally-projecting embossments thereon spaced circumferentially from one another about the tubular member, the embossments being the same in number as the bulges of the guide thimble and configured to fit therewithin;

(b) axially moving an elongated expansion member, which extends through and rotatably mounts the tubular member, relative to the tubular member from a first position in which the expansion member permits inward contraction of the tubular member and displacement of embossments thereon away from the interior of the guide thimble bulges for removing the embossments from registry therewith and a second position in which the expansion member produces radial expansion of the tubular member and displacement of the embossments thereon toward the interior of the guide thimble bulges for placing the embossments in registry therewith;

(c) rotating the tubular member relative to the expansion member so as to bring the embossments on the tubular member into alignment with the guide thimble bulges as the embossments on the tubular member are being displaced toward and into registry with the interior of the bulges; and (d) responsive to rotation of the tubular member away from a reference position, providing an indication of the orientation of the guide thimble bulges relative to a reference point upon displacement of the embossments into registry therewith.

* * * * *